United States Patent
Nail et al.

(10) Patent No.: US 10,402,764 B2
(45) Date of Patent: Sep. 3, 2019

(54) SYSTEMS AND METHODS OF CONTROLLING QUANTITIES OF DENOMINATIONS OF CURRENCY AT A RETAIL SHOPPING FACILITY

(71) Applicant: Walmart Apollo, LLC, Bentonville, AR (US)

(72) Inventors: Betsy Goosman Nail, Bentonville, AR (US); Christopher M. Johnson, Bella Vista, AR (US); Ehsan Nazarian, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 223 days.

(21) Appl. No.: 15/474,032

(22) Filed: Mar. 30, 2017

(65) Prior Publication Data
US 2017/0286883 A1    Oct. 5, 2017

Related U.S. Application Data

(60) Provisional application No. 62/317,221, filed on Apr. 1, 2016.

(51) Int. Cl.
| | | |
|---|---|---|
| G06Q 10/06 | (2012.01) | |
| G06Q 30/06 | (2012.01) | |
| G06N 20/00 | (2019.01) | |

(52) U.S. Cl.
CPC ....... *G06Q 10/06315* (2013.01); *G06N 20/00* (2019.01); *G06Q 30/0601* (2013.01)

(58) Field of Classification Search
CPC .... G06Q 20/1085; G06Q 20/18; G06Q 20/20; G07F 19/20
See application file for complete search history.

(56) References Cited

U.S. PATENT DOCUMENTS 5,799,288 A * 8/1998 Tanaka ................. G06Q 20/108
                                                  705/42
5,963,919 A * 10/1999 Brinkley .............. G06Q 10/087
                                                  705/22

(Continued)

FOREIGN PATENT DOCUMENTS

JP        2012164011        8/2012

OTHER PUBLICATIONS

Darwish, Saad, A Methodology to Improve Cash Demand Forecasting for ATM Network International Journal of Computer and Electrical Engineering, vol. 5, No. 4, Aug. 2013 (Year: 2013).*

(Continued)

*Primary Examiner* — Scott L Jarrett
(74) *Attorney, Agent, or Firm* — Fitch, Even, Tabin & Flannery LLP

(57) ABSTRACT

In some embodiments, systems and methods are provided to forecast denomination needs at one or more retail shopping facilities. The system comprises a control circuit configured to determine a predicted optimized quantity of each of multiple different denominations of currency to be available for use at a retail shopping facility over a future period of time as a function of historic needs; select for each of the multiple denominations one of multiple different models; forecast a quantity of each of the multiple denominations to be present at the termination of the first future period of time by applying the selected one of the models; and determine, for each of the multiple denominations, whether the forecasted quantity of the denomination is greater than a threshold quantity of that denomination of the currency.

14 Claims, 5 Drawing Sheets

(56) References Cited

U.S. PATENT DOCUMENTS

| | | | | |
|---|---|---|---|---|
| 6,978,249 B1* | 12/2005 | Beyer | | G06Q 10/06 705/7.31 |
| 7,028,887 B2* | 4/2006 | Chigira | | G06Q 10/08 235/376 |
| 7,340,415 B1* | 3/2008 | Gasper | | G06Q 20/1085 705/43 |
| 7,946,474 B1* | 5/2011 | Agrawal | | G06Q 10/04 235/376 |
| 8,005,728 B2* | 8/2011 | Sadler | | G06Q 10/00 705/26.1 |
| 8,234,186 B2* | 7/2012 | Alba | | G06Q 20/20 705/1.1 |
| 8,370,280 B1* | 2/2013 | Lin | | G06N 99/005 706/12 |
| 8,407,119 B2 | 3/2013 | Folk | | |
| 8,657,187 B1* | 2/2014 | Li | | G06Q 10/04 235/379 |
| 8,706,659 B1* | 4/2014 | Mann | | G06N 99/005 706/12 |
| 8,868,472 B1* | 10/2014 | Lin | | G06N 99/005 706/12 |
| 9,105,145 B2 | 8/2015 | Brown | | |
| 9,489,630 B2* | 11/2016 | Achin | | G06N 5/02 |
| 9,779,588 B2* | 10/2017 | Angus | | G06Q 10/087 |
| 2003/0126103 A1* | 7/2003 | Chen | | G06Q 10/06 706/50 |
| 2003/0200134 A1 | 10/2003 | Leonard | | |
| 2004/0030622 A1* | 2/2004 | Ramos | | G06Q 10/08 705/35 |
| 2004/0133531 A1* | 7/2004 | Chen | | G06K 9/6298 706/8 |
| 2004/0158539 A1* | 8/2004 | Akita | | G06Q 10/06 705/400 |
| 2005/0102175 A1 | 5/2005 | Dudat | | |
| 2005/0234753 A1* | 10/2005 | Pinto | | G06Q 10/04 700/44 |
| 2006/0146839 A1* | 7/2006 | Hurwitz | | G06Q 20/06 370/401 |
| 2007/0011135 A1* | 1/2007 | Chitgupakar | | G06F 17/30286 |
| 2007/0055477 A1* | 3/2007 | Chickering | | G06K 9/00503 702/182 |
| 2010/0082355 A1* | 4/2010 | Folk | | G06Q 30/0202 705/1.1 |
| 2010/0082443 A1* | 4/2010 | Folk | | G06Q 20/10 705/16 |
| 2010/0082483 A1* | 4/2010 | Sanders | | G06Q 10/087 705/42 |
| 2010/0131407 A1* | 5/2010 | Folk | | G06Q 20/10 705/39 |
| 2010/0280878 A1* | 11/2010 | Wilson | | G06Q 20/20 705/16 |
| 2012/0084118 A1* | 4/2012 | Bai | | G06Q 30/0202 705/7.31 |
| 2012/0109791 A1* | 5/2012 | Cash | | G06Q 40/12 705/30 |
| 2015/0051731 A1* | 2/2015 | Neilan | | G07D 11/0057 700/244 |
| 2015/0324702 A1 | 11/2015 | High | | |
| 2016/0323151 A1* | 11/2016 | Nahata | | H04L 41/147 |

OTHER PUBLICATIONS

Gerst, Jeremy et al., An Analytical Framework for the Forecasting and Risk Assessment of Demand for Fed Cash Services Federal Reserve Bank of San Francisco, Mar. 14, 2011 (Year: 2011).*

Gubar, Elena et al., Cash Flow Optimization in ATM Network Model St. Petersburg State University, Jun. 2011 (Year: 2011).*

NCR Aptra Opti Cash—product brochure NCR, 2014 (Year: 2014).*

Adhikari, Ratnadip et al., An Introductory Study on Time Series Modeling and Forecasting LAP Lambert Academic Publishing, Saarbrucken, Germany, 2013 (Year: 2013).*

Hyndman, Rob J., Modeling forecast accuracy Mar. 31, 2014 (Year: 2014).*

Retail Cash Management AFP—Arizona Chapter, Sep. 15, 2013 (Year: 2013).*

Simutis, Rimvydas et al., Optimization of Cash Management for ATM Network Information Technology and Control, vol. 36, No. 1A, 2007 (Year: 2007).*

SAS/ETS User's Guide, Version 8 SAS Publishing, Jun. 2004 (Year: 2004).*

Leonard, Michael, Large-Scale Automatic Forecasting: Millions of Forecasts International Symposium on Forecasting Conference, Jul. 4-7, 2004 (Year: 2004).*

Toro-Diaz, Hector Hernan et al., Chapter 10 Stochastic Optimization of a Cash Supply Chain Mehia et al., Production Systems and Supply Chain, Management in Emerging Countries: Best Practices, 2012 (Year: 2012).*

Kamini, Venkatesh et al., Cash Demand Forecasting in ATMs by Clustering and Neural Networks Universiteit Gent, Nov. 2013 (Year: 2013).*

GMT; "Balance Innovations Introduces Advanced Cash Management Software to Enhance Retail Store Profitability—vbForecast accurately determines required cash levels by denomination"; http://www.prnewswire.com/news-releases/balance-innovations-introduces-advanced-cash-management-software-to-enhance-retail-store-profitability-53496417.html; Published Jan. 15, 2007; 3 pages.

* cited by examiner

SYSTEMS AND METHODS OF CONTROLLING QUANTITIES OF DENOMINATIONS OF CURRENCY AT A RETAIL SHOPPING FACILITY

CROSS-REFERENCE TO RELATED APPLICATION

This application claims the benefit of U.S. Provisional Application No. 62/317,221, filed Apr. 1, 2016, which is incorporated herein by reference in its entirety.

TECHNICAL FIELD

This invention relates generally to controlling the quantities of different denominations.

BACKGROUND

In a modern retail environment, there is a need to improve the customer service and/or convenience for the customer. One aspect of customer service is enabling some customers to use cash to purchase products and/or receive cash advances. The use of cash at a retail facility simplifies purchases for some customers.

BRIEF DESCRIPTION OF THE DRAWINGS

Disclosed herein are embodiments of systems, apparatuses and methods pertaining forecasting and controlling the quantities of different denominations of currency at a retail shopping facility. This description includes drawings, wherein.

Figure 1:
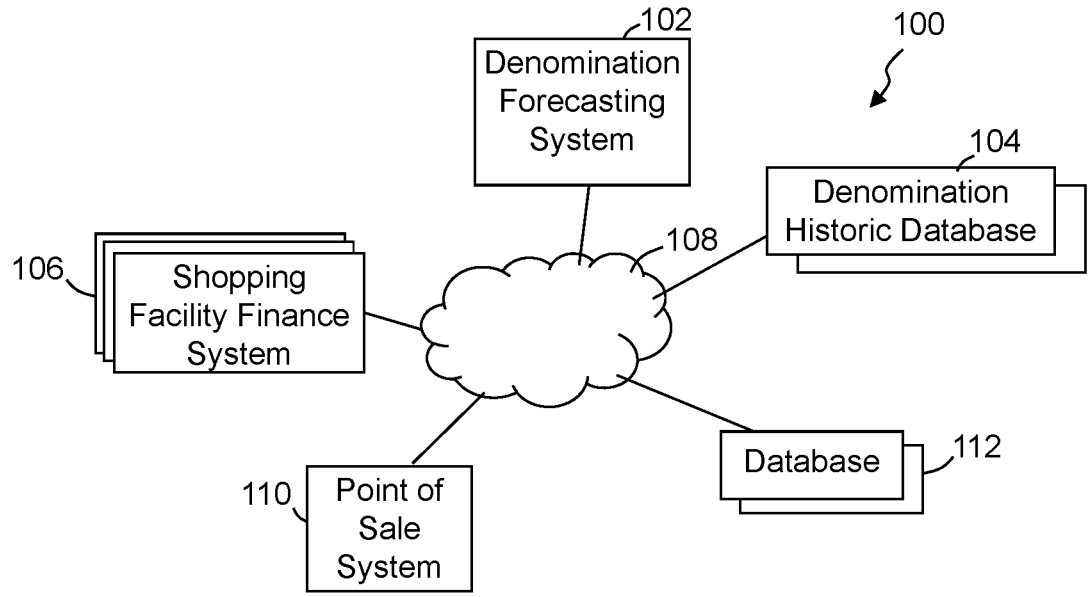
FIG. 1 illustrates a simplified block diagram of an exemplary shopping facility forecasting system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

In a modern retail environment, it is desirable that a retail shopping facility has a desired amount of cash, in the right places, and at the right times. Daily cash is utilized for retail operations for making change for the purchase of goods or services, check cashing, cash advances, and/or other such situations. Some embodiments optimize quantities of multiple denominations of cash on hand in a retail shopping facility, which in part can reduce the overall cost of capital and provides a more effective flow of currency.

Generally speaking, pursuant to various embodiments, systems, apparatuses and methods are provided that forecast denomination needs at a retail shopping facility. Some embodiments include a control circuit coupled with a transceivers and a memory coupled to the control circuit. The control circuit, in part, is configured to determine a predicted optimized quantity of each of multiple different denominations of currency to be available for use at a retail shopping facility over a future period of time as a function of historic needs of each of the multiple denominations. The future period of time is typically at least twenty four hours in the future, and often thirty-six, forty-eight or more hours in the future. For each of the multiple denominations, one of multiple different models is selected to perform a forecasting. That is, different models can be used for different denominations, and often a different model is used in forecasting each of the different denominations. A quantity of each of the multiple denominations is forecasted to be present at the shopping facility at the termination of the future period of time by applying the selected one of the models. In some embodiments, the control circuit further determines, for each of the multiple denominations of the currency, whether the forecasted quantity of the denomination of the currency is greater than a threshold quantity of that denomination of the currency.

FIG. 1 illustrates a simplified block diagram of an exemplary shopping facility forecasting system 100, in accordance with some embodiments. The shopping facility forecasting system includes one or more denomination forecasting systems 102, one or more denomination historic databases 104, and one or more shopping facility finance systems 106. The denomination forecasting system is in electronic communication with the historic database 104 and the shopping facility finance system 106 through one or more distributed computer and/or communication networks 108 (e.g., WAN, LAN, Internet, cellular, Wi-Fi, etc.). Typically, the denomination forecasting system is in communication with multiple different shopping facility finance systems each associated with a different retail shopping facility allowing the denomination forecasting system to forecast quantities of denomination for multiple different shopping facilities, and often for hundreds or thousands of different retail shopping facilities distributed over one or more geographic areas. Some embodiments include one or more point of sale systems 110 and/or the shopping facility finance system includes the point of sale systems. One or more other databases 112 may be included and/or accessible by one or more components of the system 100.

The denomination forecasting system is configured to determine a quantity of each of multiple denominations of a currency to be maintained at a particular retail shopping facility for a future period of time. For example, in the United States, the forecasting system 100 can determine one or more of: a quantity of pennies, a quantity of nickels, a quantity of dimes, a quantity of quarters, a quantity of $1 dollar bills, a quantity of $5 dollar bills, a quantity of $20 dollar bills, and a quantity of $100 bills to be maintained at the shopping facility for a future period of time. By determining a quantity of each of the multiple denominations, the forecasting system can optimize quantities, while reducing costs associated with determining quantities to maintain and in obtaining change orders. Change orders are quantities of one or more denominations that are received from a currency source (e.g., a bank or other financial institution) in response to a request. Further, by accurately forecasting denomination needs, the system can reduce occurrences of running out of a denomination.

Figure 2:
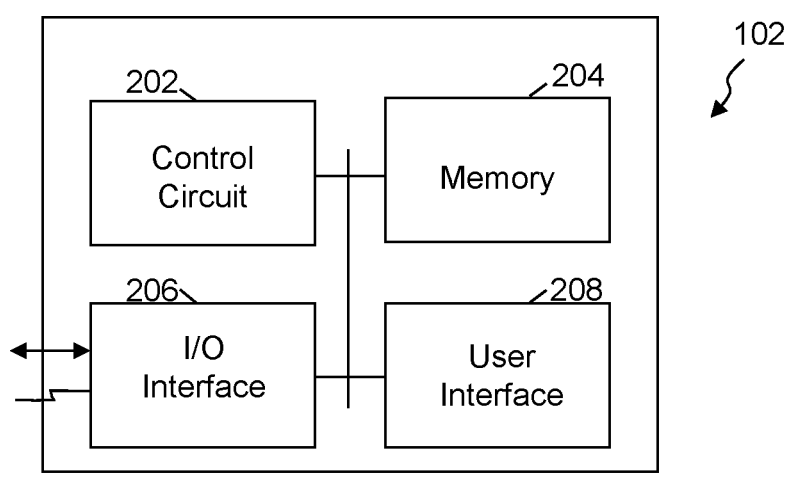
FIG. 2 illustrates a simplified block diagram of an exemplary denomination forecasting system, in accordance with some embodiments.

FIG. 2 illustrates a simplified block diagram of an exemplary denomination forecasting system 102, in accordance with some embodiments. The denomination forecasting system 102 includes one or more control circuits 202, memory 204, and input/output (I/O) interfaces and/or devices 206. Some embodiments further include one or more user interfaces 208. The control circuit 202 typically comprises one or more processors and/or microprocessors. The memory 204 stores the operational code or set of instructions that is executed by the control circuit 202 and/or processor to implement the functionality of the denomination forecasting system 102. In some embodiments, the memory 204 may also store some or all of particular data that may be used to forecast denominations quantities, track changes in forecasted denomination quantities, determine forecasted change orders, forecast optimum quantities of denominations to retain, make other associations, determinations, measurements and/or communications described herein. Such data may be pre-stored in the memory 204, received from an external source, be determined, and/or communicated to the denomination forecasting system.

In some implementations, the control circuit 202 and/or processor may be implemented as one or more processor devices as are well known in the art. Further, in some instances, the control circuit 202 may be implemented through multiple processors distributed over one or more computer networks 108. The distribution, in some implementations, enables parallel processing to provide parallel and simultaneous forecasting of multiple different retail shopping facilities. Similarly, the memory 204 may be implemented as one or more memory devices as are well known in the art, such as one or more processor readable and/or computer readable media and can include volatile and/or nonvolatile media, such as RAM, ROM, EEPROM, flash memory and/or other memory technology. Although the memory 204 is shown as internal to the denomination forecasting system 102, the memory 204 can be internal, external or a combination of internal and external memory. While FIG. 2 illustrates the various components being coupled together via a bus, it is understood that the various components may actually be coupled to the control circuit 202 and/or one or more other components directly.

Further, the control circuit 202 and/or electronic components of the denomination forecasting system 102 can comprise fixed-purpose hard-wired platforms or can comprise a partially or wholly programmable platform. These architectural options are well known and understood in the art and require no further description here. The denomination forecasting system and/or control circuit 202 can be configured (for example, by using corresponding programming as will be well understood by those skilled in the art) to carry out one or more of the steps, actions, and/or functions described herein. In some implementations, the control circuit 202 and the memory 204 may be integrated together, such as in a microcontroller, application specification integrated circuit, field programmable gate array or other such device, or may be separate devices coupled together.

The I/O interface 206 allows wired and/or wireless communication coupling of the denomination forecasting system 102 to external components, such as the denomination historic database, the shopping facility finance system, databases 112, and other such devices or systems. Typically, the I/O interface 206 provides wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some implementations, the denomination forecasting system includes one or more user interfaces 208 that may be used for user input and/or output display. For example, the user interface 208 may include any known input devices, such one or more buttons, knobs, selectors, switches, keys, touch input surfaces, audio input, and/or displays, etc. Additionally, the user interface 208 include one or more output display devices, such as lights, visual indicators, display screens, etc. to convey information to a user, such as but not limited to forecasted quantities of each of multiple denominations to retain for future periods of time, forecast change orders for future periods of time, forecast deposit amounts, forecast optimum quantities of each of multiple denominations to retain for a future period of time, status information, communication information (e.g., text messages, emails, etc.), operating status information, notifications, errors, conditions, and/or other such information. Similarly, the user interface 208 in some embodiments may include audio systems that can receive audio commands or requests verbally issued by a worker, and/or output audio content, alerts and the like.

In some embodiments, the control circuit determines a predicted optimized quantity of each of multiple different denominations of currency to be available for use at a retail shopping facility over a fixed future period of time as a function of historic needs of each of the multiple denominations. The future period of time is typically at least twenty four hours in the future, and often forty-eight or more hours in the future, which may depend on one or more factors such as regularity of change orders, access to currency sources and/or other such factors.

In forecasting, the control circuit is configured to have one or more models applied in forecasting future quantities for each denomination being considered. Further, in some embodiments, one of multiple different models is selects for each of the multiple denominations to be applied in forecasting a particular denomination for a particular shopping facility. Accordingly, in some implementations, a different model may be applied for each different denomination forecasted for a shopping facility. The number of different models considered for each denomination may vary. In some applications five or more models may be considered for one or more of the denominations. In other applications nine, ten or more models may be considered for one or more of the denominations, with a model selected for each denomination to be used in forecasting for a future period of time.

A quantity of each of the multiple denominations is forecasted to be present at the shopping facility and at the termination of the future period of time by applying the selected one of the model. For each of the multiple denominations being forecasted, a quantity of each of the multiple denominations is forecasted to be present at the shopping facility and at the termination of the future period of time by applying the selected one of the model. Typically, a shopping facility starts a fixed period of time (e.g., a period of time during a twenty-four hour period that a shopping facility is open) with a beginning balance or quantity of each denomination. Some or all of such beginning quantities are distributed to each of multiple point of sale systems 110 (e.g., cash registers, cash recyclers, self-service check-out stations, and/or other such point of sale systems). Throughout the period of time, quantities of each of the denominations are typically received from some customers as payment, and quantities of each of the denominations are typically given to customers as change. Accordingly, the quantities of each denomination vary. Further, in some instances, one or more change orders may be received at the shopping facility with an additional quantity of one or more denominations, where some or all of that additional quantity may be used during the day. Other circulation of quantities of denominations may occur at the shopping facility (e.g., cash advances, cash fund transfers, and/or other such circulations or transfers). As such, it is desirable to forecast quantities of each of multiple denominations in an attempt to at least avoid running out of a denomination. Further, by forecasting the control circuit can forecast when future change orders are predicted to be needed for one or more change orders so that the change order can be submitted to a currency source (e.g., bank) to schedule the change order(s).

Some embodiments further determine, for each of the multiple denominations of the currency, whether the forecasted quantity of the denomination is greater than a threshold quantity of that denomination of the currency. The threshold quantity can be utilized in attempts to ensure that the shopping facility does not run out of the denomination. Further, the threshold can be set based on historic information, forecasted information, and a margin of error.

Some embodiments further consider multiple different models that may be used in forecasting a quantity of each denomination. These models, in some applications, are trained based on historic data to improve the forecasting. In some embodiments, historic data over a historic period of time is accessed. The historic data corresponds at least in part to the use and/or needs of the different denominations at the shopping facility over the historic period. The duration of the historic period may vary depending on one or more factors, such as but not limited to the one or more time frames of historic data available, levels of accuracy, and other such factors. Some embodiments may utilize approximately one year, two years, four years or other such durations of historic data.

The training is typically performed on some or each of multiple different models, and for each of one or more of the denominations and generally for each denomination. In some embodiments, each of the multiple models is trained using historic data from one or more historic periods of time. Some applications utilize a first percentage of the historic data corresponding to a first percentage of the historic period of time. For example, the percentage of the historic data corresponding to 50%, 80% or some other percentage of the historic period of time may be utilized in training the one or more models. The models can, in some applications, be time series models, or other relevant types of models.

Each of the multiple trained models can further be applied to the same or different historic data over the same or different historic periods of time to generate historic forecasts for those historic periods of time. In some instances, a second percentage of the historic data corresponding to a second percentage of the historic period of time is used and the trained models generate a plurality of historic forecasts of a quantity of the denomination over the second percentage of the historic period of time. In some applications, the second percentage of the historic period of time may be the reminder of the historic period of time that is not used in training the models. For example, when 80% of the historic period of time is used to train the models, the remaining 20% may be defined as the second percentage of the historic period of time and the corresponding historic data be used to generate the historic forecasts. In other instances, the second percentage of the historic period of time may overlap the first percentage, or may be less than the remainder.

The historic forecasted cash pickups generated based on the trained models are evaluated relative to actual data corresponding to the second percentage of the historic period of time. In some embodiments, one or more of the models can be selected to preform future forecasting for a particular denomination based on the relationship of the historic forecasts relative to the actual data. Further, the control circuit can in some applications identify a model to be selected, based at least in part on the relationship between the historic forecasts and the actual data, and that produces the historic forecasts of the quantity of the denomination that corresponds to actual quantity needs of the denomination during the second percentage of the historic period of time. In some implementations, the application of each of the models relative to a denomination results in multiple data points. For example, some implementations provide, for each model, historic forecasted quantities of a denomination for each of multiple days and/or weeks over the historic period of time that the models are applied, such as the second percentage of a historic period of time. These historic forecasted quantities can be compared to actual denomination use for each of those days and/or weeks. Some embodiments generate percentage error data for historic forecasts relative to actual data. The error data may be further evaluated based on one or more factors and/or statistical analysis performed on the error data and/or the historic forecasts. For example some embodiments determine, for each forecasted quantity of the denomination, an error factor from the difference between the historic forecasted quantity of the denomination and the actual quantity need of the denomination. Further, some embodiments determine minimum average percentage error of the differences.

In some embodiments, the control circuit may determine there is an insufficient amount and/or duration of historic data to train the models to a desired level and/or perform desired historic forecasting. For example, there may be an insufficient duration of historic data to allow for a sufficient number of historic forecasts to obtain a sufficient sample size for consideration in selecting one of the multiple models. Some embodiments may additionally or alternatively consider historic data for one or more other similar retail shopping facilities in training and/or obtaining the historic forecasts. In some implementations, the control circuit identifies when there is insufficient historic data corresponding to a retail shopping facility of interest. A secondary retail shopping facility can be identified that is similar to the shopping facility of interest. For example, the secondary shopping facility may have sales that are consistent with those of the shopping facility of interest, may have a size and/or carry products that are consistent with those of the shopping facility of interest, may have customer demographics consistent with those of the shopping facility of interest, other such factors or combinations of two or more of such factors that are consistent with those of the shopping facility of interest. Historic data of the historic period of time corresponding to the secondary retail shopping facility can be accessed. This historic data of the secondary shopping facility can be used to train one or more of the models for one or more of the denominations, and/or be used to evaluate one or more of the models in selecting a model for each of one or more of the denominations.

As described above, some embodiments further attempt to predict optimum quantities of each of multiple denominations to be maintained at the shopping facility. This can include optimizing quantities of different denominations that are to be maintained for a given business day. This predicted optimization of quantities of each of the multiple different denominations can include an evaluation of cost differences between holding an excess quantity of one or more of the multiple denominations versus depositing the excess quantity of the one or more of the multiple denominations with a banking entity. Many banks pay interest on money maintained for an entity. Accordingly, the shopping facility may receive additional revenue through interest payments from the bank by depositing money that is not needed at the shopping facility to continue to conduct business (i.e., depositing excess quantities of denominations not needed during a given period of time). However, by over depositing the shopping facility may run out of one or more denominations, which may have some effect on operation and/or may result in added costs as a result of submitting a change order to a bank or other currency source to receive additional quantities of one or more denominations. There often are other costs associated with receiving change orders (e.g., cost of time for processing and distributing, loss of potential interest payments, and other such costs). As such, the control circuit, in some implementations, attempts to determine an optimum number of each of multiple denominations to be maintained at the shopping facility (i.e., not deposited) so there is sufficient quantities of the denominations to avoid running out of a denomination or running out within a threshold limit, limit change orders, and attempting to maximize deposits. Some embodiments, for example, in evaluating the cost difference further calculate expected interest income from the depositing of the excess quantity of one or more denominations, and an identified cost associated with receiving from a currency source a change order comprising an additional quantity of one or more of the multiple denominations for use at the first shopping facility during the first future period of time.

Further, some embodiments use the forecasted quantities of one or more denominations in predicting when a future change order is expected. The control circuit can be configured to determine a future change order of a specified quantity of one or more denominations to be received at the shopping facility during one or more future periods of time from a currency source. By predicting when a change order is expected and forecasting the quantity of the change order, the change orders can be scheduled in advance. In some embodiments the future change order for one or more denominations is determined as a function of a difference between the forecasted quantity of a denomination at the termination of the future period of time and a threshold quantity corresponding to that denomination. In some instances, the forecasting of the change orders can take into account the ability to receive a change order. In some locations, change orders may not be available on every day of the week, and/or in some locations additional time is needed to receive the change order. As such, the prediction of when a change order is expected to be needed in the future, the control circuit can cause the change order requests to be issued with sufficient time to receive the change orders by the time the change order is needed.

In some implementations, the shopping facility forecasting system 100 and/or the denomination forecasting systems 102 is configured to disregard one or more potential denominations of one or more currencies that the shopping facility does not intend to carry. Some embodiments force out one or more denominations of one or more currencies. For example, the control circuit may force out an additional denomination, which has a value between two other denominations, from use at the shopping facility and disregards the additional denomination, and does not determine a predicted optimized quantity for the additional denomination. In some shopping facilities, for example, it may be advantageous to not carry a denomination (e.g., a U.S. $10 bill), and instead use other denominations (e.g., U.S. $1 and $5 bills) to compensate for that denomination not being carried. This can result in a cost savings by not having to predict for, carry, deposit and/or receive change orders for that forced out denomination. Similarly, some embodiments can be configured to accept denominations of one or more different currencies. The denominations of the one or more currencies can be forced out and not retained by the system.

Figure 3:
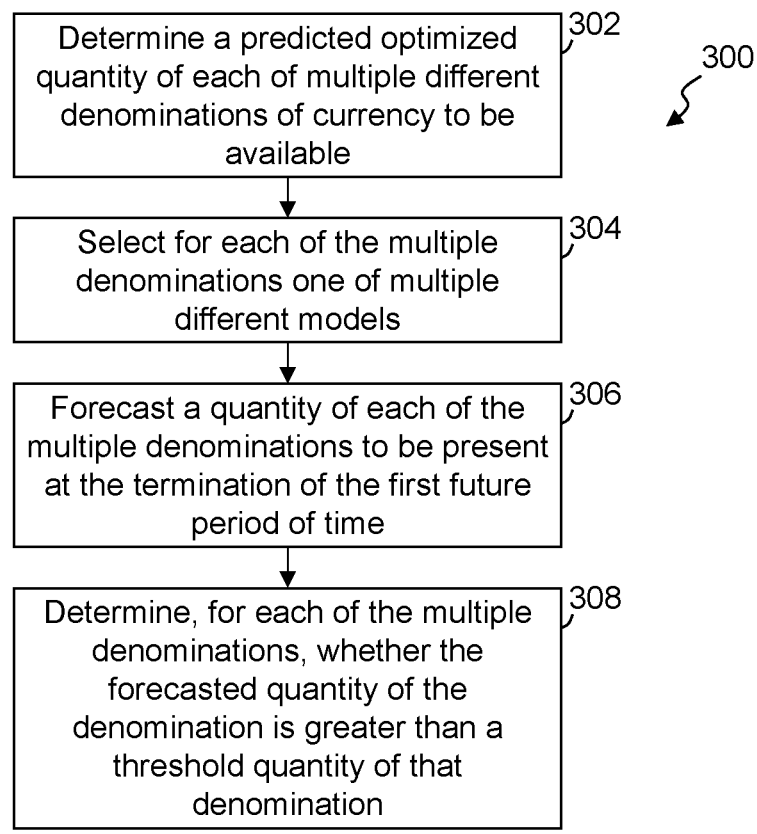
FIG. 3 illustrates a simplified flow diagram of a process of forecasting denomination needs at a retail shopping facility.

FIG. 3 illustrates a simplified flow diagram of a process 300 of forecasting denomination needs at a retail shopping facility. In some embodiments, the process 300 is performed for each shopping facility being considered, as well as for each denomination evaluated at the particular shopping facility. In step 302, a predicted optimized quantity is determined for each of multiple different denominations of currency to be available for use at a first retail shopping facility over a future period of time as a function of historic needs of each of the multiple denominations. The future period of time is typically at least twenty four hours in the future, and often forty-eight or more hours in the future.

In step 304, one of multiple different available models is selected for each of the multiple denominations. In step 306, a quantity of each of the multiple denominations is forecasted to be present at the termination of the future period of time by applying the selected model. In step 308, it is determined, for each of the multiple denominations of the currency, whether the forecasted quantity of the denomination of the currency is greater than a threshold quantity of that denomination of the currency.

Some embodiments, in selecting a model for a denomination access historic data over one or more historic periods of time for each denomination, and use at least a portion of the historic data to train multiple models for each denomination. Some embodiments train each of the multiple models, for each denomination, using a first percentage of the historic data corresponding to one or more historic periods and/or corresponding to a first percentage of one or more historic periods of time. Each of the multiple trained models can be applied to a second percentage of the historic data corresponding to one or more other historic periods of time and/or a second percentage of one or more historic period of times, and a plurality of historic forecasts of a quantity of the denomination are generated over the second percentage of the historic period of time. In some embodiments, a model can be identified and selected for a denomination that produces the historic forecasts of the quantity of the denomination that corresponds to actual quantity needs of the denomination during the second percentage of the historic period of time. Some embodiments in evaluating the historic forecasts, determine, for each forecasted quantity of the denomination, an error factor from the difference between the historic forecasted quantity of the denomination and the actual quantity need of the denomination, and determining minimum average percentage error of the differences.

Typically, the historic data corresponds to the shopping facility for which the forecasting is being performed. In some instances, however, there may be insufficient historic data to effectively train and/or evaluate the models. As such, some embodiments identify when there is insufficient historic data corresponding to a first retail shopping facility, and identify a secondary retail shopping facility that has characteristics (e.g., sales, inventory, customer demographics, pricing, denomination use, other such characteristics, or combination of two or more of such characteristics) that are consistent with the first shopping facility. The historic data of the historic period of time corresponding to the secondary retail shopping facility can be accessed, and be used to train and/or evaluate models in selecting, for each denomination, one of the multiple different models. Again, in some instances, a different model may be selected for each denomination.

Some embodiments determine a future change order of a specified quantity of one or more denominations to be received at the shopping facility during a future period of time from a currency source. The future change order can be determined as a function of a difference between the forecasted quantity of a denomination at the termination of the future period of time and the threshold quantity corresponding the denomination. In some applications, cost differences between holding an excess quantity of one or more of the multiple denominations versus depositing the excess quantity of the one or more of the multiple denominations with a banking entity are evaluated in determining a predicted optimized quantity of one or more denominations. In evaluating the cost difference, some embodiments calculate expected interest income from the depositing of the excess quantity, and an identified cost associated with receiving from a currency source a change order comprising an additional quantity of one or more of the multiple denominations for use at the first shopping facility during the first future period of time.

Further, some embodiments disregard a denomination that is not going to be carried at the shopping facility and/or that is being forced out of the shopping facility. As such, some embodiments force out a denomination of currency from use at the shopping facility. The denomination being forced out may, for example, may have a value between two other denominations, and/or one or more other denominations can be utilized in place of the forced out denomination. The system can disregard the denomination being forced out, and a predicted optimized quantity for that denomination is typically not performed. Similarly, some embodiments may configure the system to allow the shopping facility to accept foreign currency from customers. Such foreign currency is typically not evaluated and instead can be forced out, while enabling the acceptance of the foreign currency.

Figure 4:
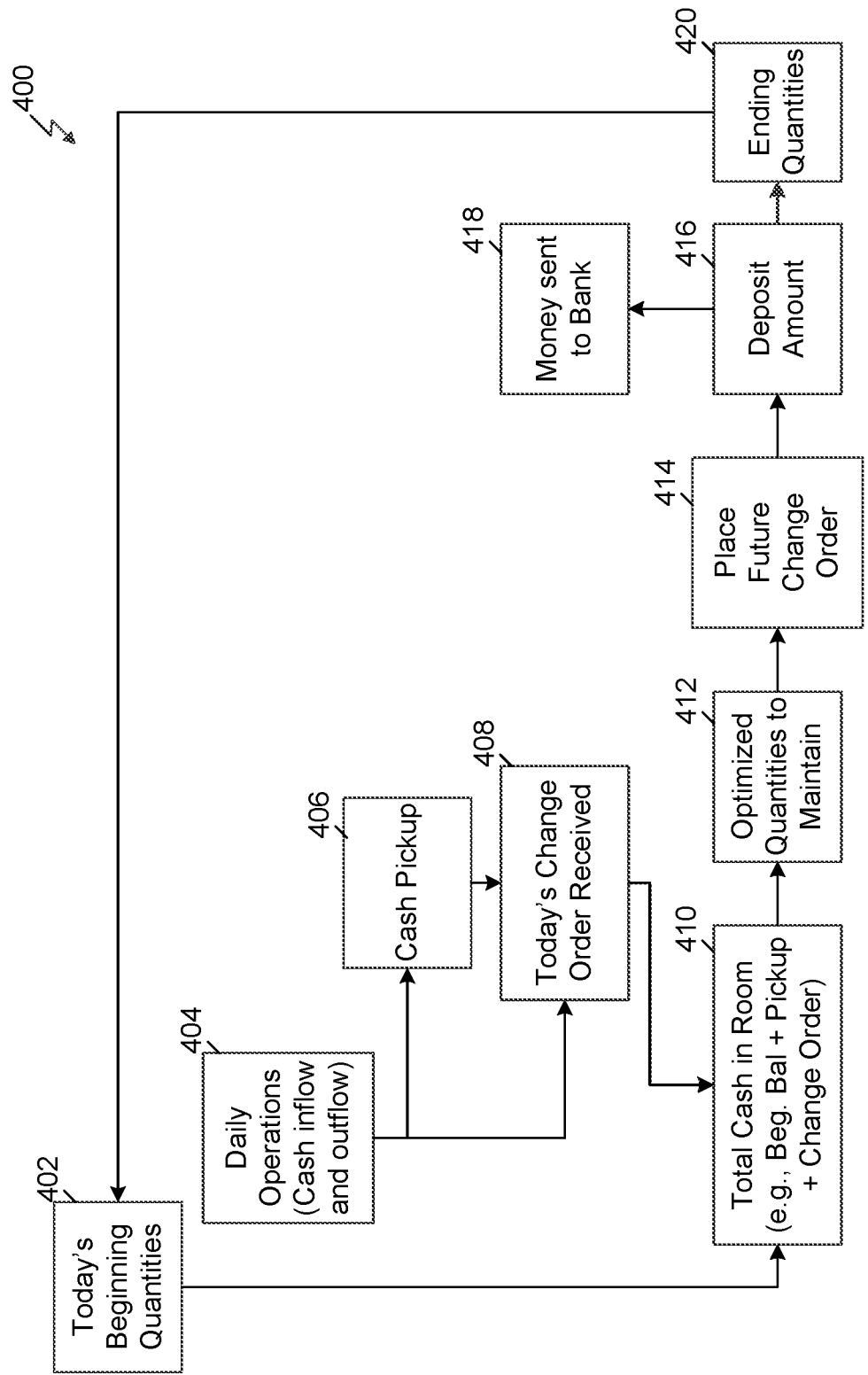
FIG. 4 illustrates a simplified flow diagram of an exemplary process of managing denomination flow through a shopping facility based on forecasted quantities of denomination and controlling the quantities of denominations maintained at a shopping facility, in accordance with some embodiments.
Figure 5:
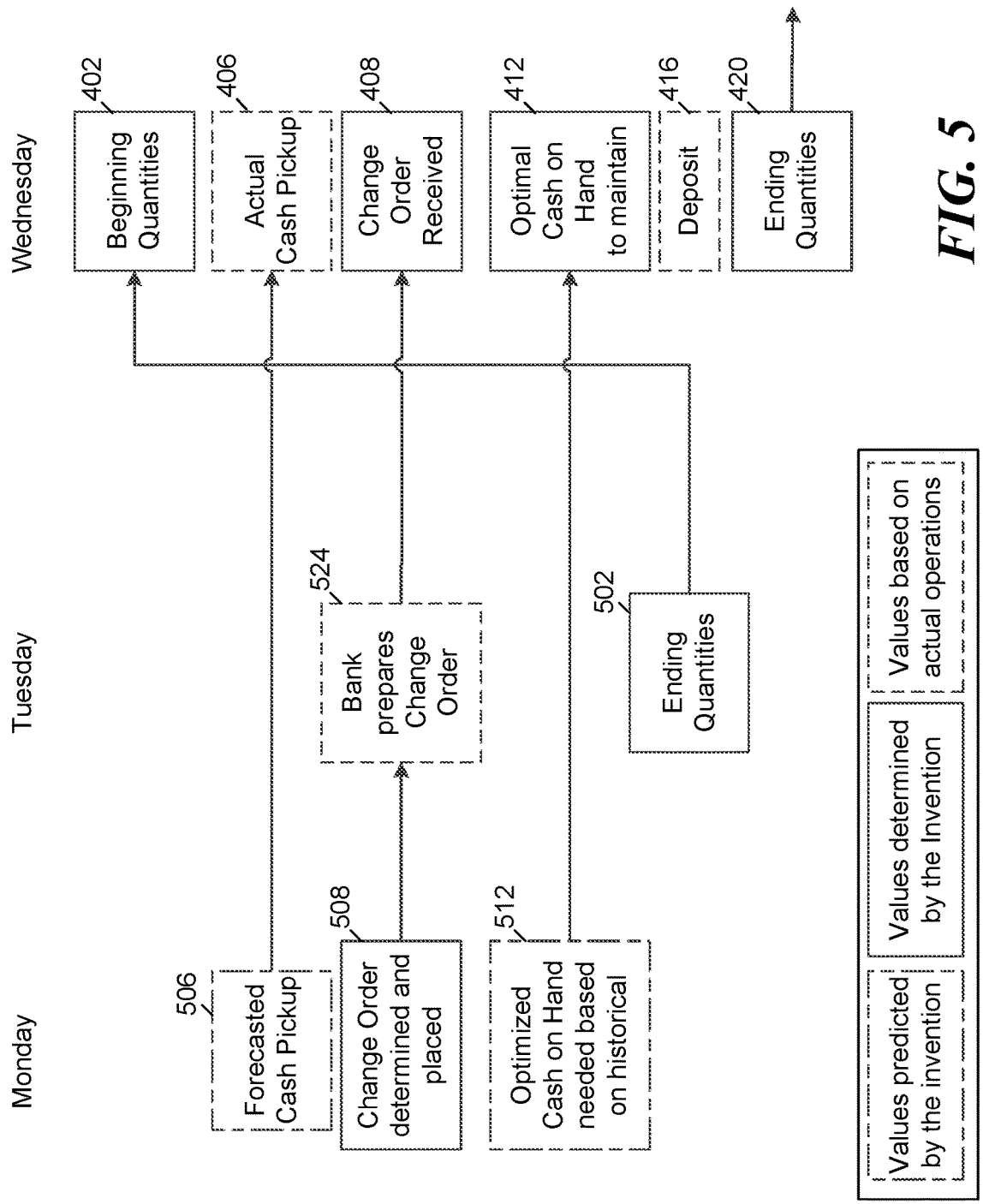
FIG. 5 illustrates an exemplary timing diagram of the exemplary process of FIG. 4 being implemented for a particular day, in accordance with some embodiments.

FIG. 4 illustrates a simplified flow diagram of an exemplary process 400 of managing denomination flow through a shopping facility based on forecasted quantities of denomination and controlling the quantities of denominations maintained at a shopping facility, in accordance with some embodiments. FIG. 5 illustrates an exemplary timing diagram of the exemplary process 400 of FIG. 4 being implemented for a particular day (e.g., Wednesday), in accordance with some embodiments. Referring to FIGS. 4-5, in step 402, a beginning quantity for each of multiple denominations being evaluated is identified, and/or beginning balance for each denomination is obtained. The beginning quantities are typically intended for a specific period of time during which a shopping facility may be opened, and in some instances may correspond to a particular twenty-four hour period of time (e.g. a Wednesday). The description of FIGS. 4-5 are presented with reference to the period of time being a single day. It will be appreciated that the period of time can be different from a day (e.g., may be part of a day, extend over multiple days, etc.). Further, the beginning quantities are intended to be used throughout the period by at the point of sales systems and other locations in the shopping facility where denominations are used. In some embodiments, the beginning quantities correspond to ending quantities 502 determined the previous day.

In step 404, a predicted daily operations quantities for each denomination are obtained. Typically, the predicted daily operations includes at least a predicted cash pickup 406 for each denomination. In some embodiments, the cash pickup includes the amount of each denomination that is collected at the retail shopping facility after a day's operation. For example, cash from the operation can be collected at an end of a day (e.g., midnight) and counted to determine the cash collected by denomination. In some instances, the cash pickup includes the cash acquired from the point of sale systems (e.g., registers). As described above, the cash pickup is previously forecasted 506 one or more days prior to the current day (e.g., on Monday). The predicted daily operations may further include one or more change orders 408 for one or more denominations, if a change order is received. Again, a change order is quantities of one or more denominations received from an outside currency source (e.g., a bank) to account for predicted insufficient quantities of the one or more denominations. In some embodiments, the change orders are predicted 508 one or more days in advance for the current day and ordered to be delivered on the current day's operation. The bank prepares the change order 524 for delivery on the scheduled day.

In step 410, total quantities of each of the multiple denominations being considered is determined as a function of at least the beginning quantities, the predicted cash pickup and the change orders received. In step 412, quantities of each denomination are collected in accordance with forecasted quantities 512 to be maintained at the shopping facility for a subsequent day's operation. The forecasted optimum quantities to be maintained 512 take into consideration the forecasted cash pickups, predicted change orders, and daily operations. Some embodiments further consider the cost difference between keeping amounts of denominations, benefits of depositing amounts of denominations, cost of receiving change orders, and other such factors. In step 414, one or more future change orders for one or more denominations that are predicted to be needed for one or more future days are forecasted and in some instances communicated to the bank or other source. Again, the total quantities of denominations can be predicted for the future day, and based on the determined optimum quantities that are to be maintained and the forecasted use of denominations, the system can forecast when a day is predicted to have an insufficient quantity of one or more denominations. The forecasting allows for the prediction of potential shortages of denominations one or more days in advance.

In step 416, quantities of excess denominations above the quantities of denominations to be maintained at the shopping facility are identified to be deposited with the bank. In step 418, the deposits are forwarded to the bank. In step 420, the quantities of denominations to be maintained are used to define the ending balance, which defines the subsequent day's beginning quantity and/or balance.

Figure 6:
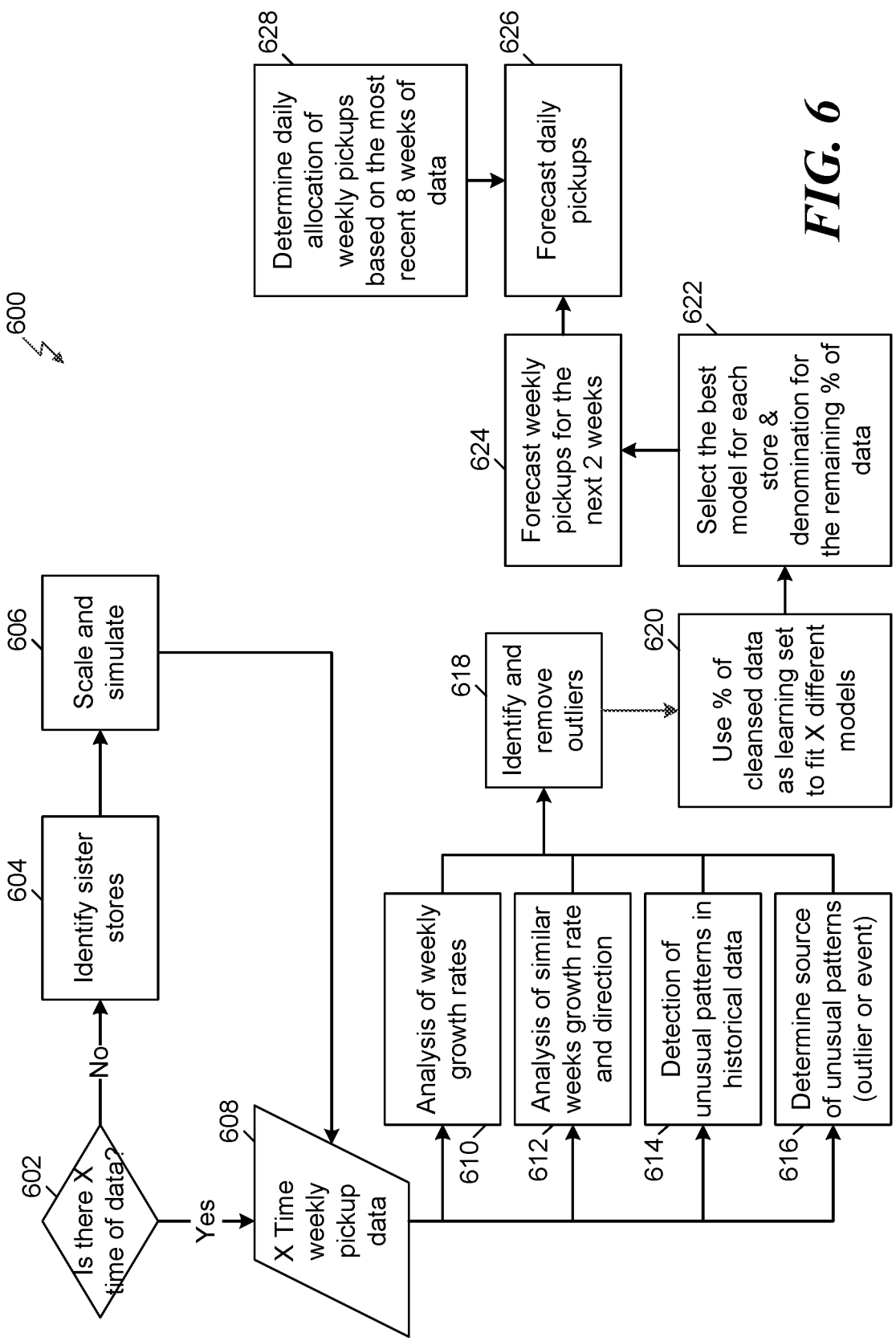
FIG. 6 illustrates a simplified flow diagram of an exemplary process of forecasting cash pickups, in accordance with some embodiments.

FIG. 6 illustrates a simplified flow diagram of an exemplary process 600 of forecasting cash pickups, in accordance with some embodiments. Again, in some embodiments, the process 600 is performed for each shopping facility being considered, as well as for each denomination evaluated at the particular shopping facility. In step 602, it is determined whether there is sufficient amount of historic data specific to the shopping facility being evaluated to be used to train and/or evaluate each of multiple different models. As described above, a model is selected for each denomination and used to forecast at least future cash pickups at a particular shopping facility. It is desirable to effectively train each of the models in order to achieve more accurate forecasting. Accordingly, some embodiments attempt to obtain a sufficient amount of historic data relative to each denomination to be evaluated that can be used to train each of multiple models for each of the different denominations. For example, some applications attempt to obtain at least two years of historic data that proceeds the current time when the forecasting is being performed. In some implementations, the historic data includes data corresponding to historic cash pickups, quantities of denominations utilized for each of multiple periods of time (e.g., each week, each day, etc.), and/or other such information. Additionally or alternative historic data may include quantities of denominations received from customers, change orders, and other such information.

When there is not sufficient historic data corresponding to a particular shopping facility (e.g., less than two years of historic cash pickup data for a first shopping facility), step 604 is entered where one or more secondary shopping facilities are identified that correspond to the shopping facility being evaluated, and has a threshold amount of cash pickup historic data. For example, a secondary shopping facility may have similar sales, size, population, percentage cash tenders, inventory, customer demographics, and/or other such characteristics. When available, hundreds or even thousands of different shopping facilities may be considered in attempting to identify a corresponding shopping facility. Some embodiments include step 606 where the historic data from the secondary shopping facility may be scaled, and/or adjusted (e.g., based on variations between the shopping facility being evaluated and the secondary shopping facility).

In step 608, the historic data is evaluated in an attempt to address anomalies, inaccuracies, inconsistencies, and detect trends. For example, some embodiments in step 610 analyze growth rates, such as looking at whether growth rates have been consistent, look to see if there has been unusual change in weekly growth rates; step 612 evaluate similar weeks growth rates and direction (e.g., look at similar holiday weeks over two or more years, weeks leading up to the beginning of school, and other such data); step 614 identify unusual incidents of use of one or more denominations; step 616 determine whether a source can be determined for the unusual incidents, and/or other such evaluations.

In step 618, some of the historic data may be adjusted, modified, cleaned, extracted or otherwise processed to address inconsistencies and/or anomalies. This can include removing unusual outliers of denomination use. In step 620, at least a portion of the historic data is used to train each of multiples different models that may be used in forecasting cash pickups. Any number of models may be used. Some applications utilize eight, nine, ten or more models. Further, the amount of the historic data used to train the models can depend on one or more factors, such as the amount of historic data available, the number and/or types of inconsistencies, and the like. In some implementations for example, a percentage (e.g., 60-80%) of the historic data for a denomination and for a shopping facility is used to train the multiple models.

In step 622 a portion of the historic data is used to test the trained models relative to a denomination. For example, some embodiments may use 20-40% of the historic data to test the trained models. Each trained model is applied to historic data to generate historic forecasts of cash pickups corresponding to multiple different time periods (e.g., historic weekly forecasts, historic daily forecasts, etc.). The historic forecasts of the multiple cash pickups can be compared to the actual cash pickups that occurred for the corresponding denomination over the percentage of historic period of time (e.g., 20% of two years) and an accuracy of each of the models can be determined. Some embodiments determine a percentage accuracy for each of the multiple historic forecasts. Additionally or alternatively, an absolute percentage error using the multiple different forecasted cash pickups relative to actual pickups can be determined over the historic period ((([historic forecast−actual])/actual)=percentile error). Some embodiments select the model producing the minimum average percentage error (MAPE) for a particular denomination and for a particular shopping facility.

In step 624, the selected model is used to forecast one or more future cash pickups. For example, some embodiments forecast weekly pickups for a particular denomination for the next two weeks. Some embodiments include step 626 where daily cash pickups are determined for each day of the two weeks. For example, the weekly pickups may be allocated to each day based on historic allocations of weekly pickups. Some embodiments use historic data in determining daily allocations. For example, step 628 may determine daily allocations of pickups using recent historic data (e.g., most recent eight weeks of historic data).

In some embodiments, systems, apparatuses and methods are provided to forecast denomination needs at a retail shopping facility. Some systems comprise: a control circuit coupled with a transceivers; and a memory coupled to the control circuit and storing computer instructions that when executed by the control circuit cause the control circuit to: determine a predicted optimized quantity of each of multiple different denominations of currency to be available for use at a first retail shopping facility over a first future period of time as a function of historic needs of each of the multiple denominations, wherein the first future period of time is at least twenty four hours in the future; select for each of the multiple denominations one of multiple different models; forecast a quantity of each of the multiple denominations to be present at the termination of the first future period of time by applying the selected one of the models; and determine, for each of the multiple denominations of the currency, whether the forecasted quantity of the denomination of the currency is greater than a threshold quantity of that denomination of the currency.

Further, some embodiments provide methods of forecasting denomination needs at a retail shopping facility, comprising: determining a predicted optimized quantity of each of multiple different denominations of currency to be available for use at a first retail shopping facility over a first future period of time as a function of historic needs of each of the multiple denominations, wherein the first future period of time is at least twenty four hours in the future; selecting for each of the multiple denominations one of multiple different models; forecasting a quantity of each of the multiple denominations to be present at the termination of the first future period of time by applying the selected one of the models; and determining, for each of the multiple denominations of the currency, whether the forecasted quantity of the denomination of the currency is greater than a threshold of the forecasted quantity of that denomination of the currency.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system to forecast denomination needs at a retail shopping facility, comprising:
    a control circuit coupled with a transceivers; and
    a memory coupled to the control circuit and storing computer instructions that when executed by the control circuit cause the control circuit to:
    determine a predicted optimized quantity of each of multiple different denominations of currency to be available for use at a first retail shopping facility over a first future period of time as a function of historic needs of each of the multiple denominations, wherein the first future period of time is at least twenty four hours in the future;
    select for each of the multiple denominations one of multiple different models;
    forecast a quantity of each of the multiple denominations to be present at the termination of the first future period of time by applying the selected one of the models;
    determine, for each of the multiple denominations of the currency, whether the forecasted quantity of the denomination of the currency is greater than a threshold quantity of that denomination of the currency;
    cause the optimized quantity of each of multiple different denominations to be maintained by the retail shopping facility as beginning quantities at the beginning of the first future period of time and at least portions of each of the denominations distributed to point of sale systems of the retail shopping facility for use during the first future period of time; and
    force out an additional denomination of the currency that has a value between two of the multiple denominations from use at the first shopping facility disregarding the additional denomination of the currency, and does not determine a predicted optimized quantity for the additional denomination.

2. The system of claim 1, wherein the control circuit, in selecting for each of the multiple denominations one of the multiple different models, is further configured to:
    access historic data over a historic period of time;
    for each denomination:
        train each of the multiple models using a first percentage of the historic data corresponding to a first percentage of the historic period of time;
        apply each of the multiple trained models to a second percentage of the historic data corresponding to a second percentage of the historic period of time and generate a plurality of historic forecasts of a quantity of the denomination over the second percentage of the historic period of time; and
        identify the selected model producing the historic forecasts of the quantity of the denomination that corresponds to actual quantity needs of the denomination during the second percentage of the historic period of time.

3. The system of claim 2, wherein the control circuit is further configured to determine, for each forecasted quantity of the denomination, an error factor from the difference between the historic forecasted quantity of the denomination and the actual quantity need of the denomination, and determine minimum average percentage error of the differences.

4. The system of claim 2, wherein the control circuit is further configured to identify when there is insufficient historic data corresponding to the first retail shopping facility, identify a secondary retail shopping facility that has sales consistent with the first shopping facility, and access the historic data of the historic period of time corresponding to the secondary retail shopping facility.

5. The system of claim 1, wherein the control circuit is further configured to determine a future change order of a specified quantity of a first denomination to be received at the first shopping facility during the first future period of time from a currency source, wherein the future change order is determined as a function of a difference between the forecasted quantity of the first denomination at the termination of the first future period of time and the threshold quantity corresponding the first denomination.

6. The system of claim 1, wherein the control circuit, in determining the predicted optimized quantity of each of the multiple different denominations, is further configured to evaluate cost difference between holding an excess quantity of one or more of the multiple denominations versus depositing the excess quantity of the one or more of the multiple denominations with a banking entity.

7. The system of claim 6, wherein the control circuit, in evaluating the cost difference, is further configured to calculate expected interest income from the depositing of the excess quantity, and an identified cost associated with receiving from a currency source a change order comprising an additional quantity of one or more of the multiple denominations for use at the first shopping facility during the first future period of time.

8. A method of forecasting denomination needs at a retail shopping facility, comprising:
    by a denomination forecasting control circuit comprising a processor implementing code to perform the steps of:
    determining a predicted optimized quantity of each of multiple different denominations of currency to be available for use at a first retail shopping facility over a first future period of time as a function of historic needs of each of the multiple denominations, wherein the first future period of time is at least twenty four hours in the future;

selecting for each of the multiple denominations one of multiple different models;

forecasting a quantity of each of the multiple denominations to be present at the termination of the first future period of time by applying the selected one of the models;

determining, for each of the multiple denominations of the currency, whether the forecasted quantity of the denomination of the currency is greater than a threshold of the forecasted quantity of that denomination of the currency;

causing the optimized quantity of each of multiple different denominations to be maintained by the retail shopping facility as beginning quantities at the beginning of the first future period of time and at least portions of each of the denominations distributed to point of sale systems of the retail shopping facility for use during the first future period of time; and forcing out an additional denomination of the currency, which has a value between two of the multiple denominations, from use at the first shopping facility disregarding the additional denomination of the currency, and not determining a predicted optimized quantity for the additional denomination.

9. The method of claim 8, further comprising:
accessing historic data over a historic period of time;
for each denomination:
training each of the multiple models using a first percentage of the historic data corresponding to a first percentage of the historic period of time;
applying each of the multiple trained models to a second percentage of the historic data corresponding to a second percentage of the historic period of time and generate a plurality of historic forecasts of a quantity of the denomination over the second percentage of the historic period of time; and
identifying the selected model producing the historic forecasts of the quantity of the denomination that corresponds to actual quantity needs of the denomination during the second percentage of the historic period of time.

10. The method of claim 9, further comprising:
determining, for each forecasted quantity of the denomination, an error factor from the difference between the historic forecasted quantity of the denomination and the actual quantity need of the denomination; and
determining minimum average percentage error of the differences.

11. The method of claim 9, wherein the accessing the historic data over the historic period of time comprises:
identifying when there is insufficient historic data corresponding to the first retail shopping facility;
identifying a secondary retail shopping facility that has sales consistent with the first shopping facility; and
accessing the historic data of the historic period of time corresponding to the secondary retail shopping facility.

12. The method of claim 8, further comprising:
determining a future change order of a specified quantity of a first denomination to be received at the first shopping facility during the first future period of time from a currency source, wherein the future change order is determined as a function of a difference between the forecasted quantity of the first denomination at the termination of the first future period of time and the threshold quantity corresponding the first denomination.

13. The method of claim 8, wherein the determining the predicted optimized quantity of each of the multiple different denominations comprises evaluating cost differences between holding an excess quantity of one or more of the multiple denominations versus depositing the excess quantity of the one or more of the multiple denominations with a banking entity.

14. The method of claim 13, wherein the evaluating the cost difference further comprises calculating expected interest income from the depositing of the excess quantity, and an identified cost associated with receiving from a currency source a change order comprising an additional quantity of one or more of the multiple denominations for use at the first shopping facility during the first future period of time.

* * * * *